United States Patent
Ziolkowski et al.

(10) Patent No.: US 12,327,111 B2
(45) Date of Patent: Jun. 10, 2025

(54) SOFTWARE MICROSERVICE GENERATION

(71) Applicant: BRITISH TELECOMMUNICATIONS PUBLIC LIMITED COMPANY, London (GB)

(72) Inventors: Adam Ziolkowski, London (GB); Alistair McCormick, London (GB); Emmanuel Ferreyra Olivares, London (GB); Johannes Noppen, London (GB)

(73) Assignee: British Telecommunications Public Limited Company, London (GB)

( * ) Notice: Subject to any disclaimer, the term of this patent is extended or adjusted under 35 U.S.C. 154(b) by 84 days.

(21) Appl. No.: 18/551,486

(22) PCT Filed: Mar. 10, 2022

(86) PCT No.: PCT/EP2022/056219
§ 371 (c)(1),
(2) Date: Sep. 20, 2023

(87) PCT Pub. No.: WO2022/200063
PCT Pub. Date: Sep. 29, 2022

(65) Prior Publication Data
US 2024/0176615 A1    May 30, 2024

(30) Foreign Application Priority Data
Mar. 22, 2021  (GB) .................................... 2103916

(51) Int. Cl.
*G06F 8/72*  (2018.01)
(52) U.S. Cl.
CPC ...................................... *G06F 8/72* (2013.01)
(58) Field of Classification Search
CPC .............................................. G06F 8/72
See application file for complete search history.

(56) References Cited

U.S. PATENT DOCUMENTS

| | | |
|---|---|---|
| 8,607,190 B2 | 12/2013 | Coldicott et al. |
| 8,676,853 B2 | 3/2014 | Kasravi et al. |
| | (Continued) | |

FOREIGN PATENT DOCUMENTS

| | | | | |
|---|---|---|---|---|
| CN | 106775915 A | * | 5/2017 | ............ G06F 8/443 |
| CN | 108279926 A | | 7/2018 | |
| | (Continued) | | | |

OTHER PUBLICATIONS

Yuen et al., "A Genetic Algorithm That Adaptively Mutates and Never Revisits" (Year: 2009).*

(Continued)

*Primary Examiner* — Phillip H Nguyen
(74) *Attorney, Agent, or Firm* — EIP US LLP

(57) ABSTRACT

A computer implemented method of generating a software service for providing required software functionality can include accessing a software component having functionality including and exceeding the required functionality; defining verification test for verifying that the software component includes the required functionality; applying a genetic algorithm to the software component to iteratively adapt the software component over a plurality of generations, wherein each generation of the software component is adapted by removal of one or more portions of the software component of a preceding generation, wherein the adaptation for a generation is selected from a set of candidate adaptations based on a determination of a fitness of the component so adapted, the fitness being determined by the verification test, wherein the iteration of the genetic algorithm ceases in response to a stopping condition such that, on cessation, the latest generation of the software component constitutes the software service.

7 Claims, 2 Drawing Sheets

(56) References Cited

U.S. PATENT DOCUMENTS

| | | | |
|---|---|---|---|
| 10,628,152 | B2 | 4/2020 | Chandramouli et al. |
| 10,756,982 | B2 | 8/2020 | Bai |
| 10,782,936 | B1 | 9/2020 | Davis et al. |
| 10,810,502 | B2 | 10/2020 | Pillai et al. |
| 2014/0358831 | A1 | 12/2014 | Adams et al. |
| 2017/0220323 | A1 | 8/2017 | Dsouza |
| 2019/0122119 | A1 | 4/2019 | Husain |
| 2019/0180187 | A1 | 6/2019 | Rawal et al. |
| 2020/0065712 | A1 | 2/2020 | Wang et al. |
| 2020/0293295 | A1 | 9/2020 | Gao et al. |
| 2021/0029001 | A1 | 1/2021 | Sen et al. |

FOREIGN PATENT DOCUMENTS

| | | | | |
|---|---|---|---|---|
| CN | 109933309 | A | | 6/2019 |
| CN | 111857691 | A | | 10/2020 |
| JP | 2007304685 | A | * 11/2007 ....... G06F 17/30958 |
| KR | 20190048895 | A | | 5/2019 |

OTHER PUBLICATIONS

Mathew, "Genetic Algorithm" (Year: 2012).*
"Data and AI Reference Architecture", available from https://ibm-cloud-architecture.github.io/refarch-data-ai-analytics/, Mar. 18, 2021, 6 pages.
"International Search Report and Written Opinion received for PCT Patent Application No. PCT/EP2022/056219, mailed on Jun. 24, 2022".
"International Search Report and Written Opinion received for PCT Patent Application No. PCT/EP2022/056230, mailed on Jun. 24, 2022".
"Office Action received for Great Britan Patent Application No. 2103916.9 mailed on Mar. 14, 2023".
"Office Action received for Great Britian Patent Application No. 2103917.7, mailed on Sep. 22, 2021".
"Search Report received for Great Britain Patent Application No. 2103916.9, mailed on Aug. 12, 2021".
Bakirtzis, et al., "Chapter 19—Genetic Algorithms", Advanced Solutions in Power Systems: HVDC, FACTS, and Artificial Intelligence: HVDC, Facts, and Artificial Intelligence, 2016, pp. 845-902.
Brandon, et al., "Graph-based Root Cause Analysis for Service-Oriented and Microservice Architectures", Journal of Systems and Software, vol. 159, 110432, 2020, 27 pages.
Carvalho, et al., "On the Performance and Adoption of Search-Based Microservice Identification with to Microservices", IEEE International Conference on Software Maintenance and Evolution (ICSME), DOI 10.1109/ICSME46990.2020.00060, 2020, pp. 569-580.
Cooper, et al., "Optimizing for Reduced Code Space Using Genetic Algorithms", ACM SIGPLAN Notices, vol. 34, No. 7, DOI: 10.1145/314403.314414, May 1999, pp. 1-9.
He, et al., "AutoML: A Survey of the State-of-the-Art", Knowledge-Based Systems 212 (2021) 106622, available from https://doi.org/10.1016/j.knosys.2020.106622, Jun. 21, 2021, 33 pages.
Schatsky, et al., "AI is Helping to Make Better Software", Deloitte, available from https://www2.deloitte.com/us/en/insights/focus/signals-for-strategists/ai-assisted-software-development.html, Jan. 22, 2020, 6 pages.
Subedha, et al., "Optimization of Component Extraction for Reusable Software Components in Context Level—A Systematic Approach", ICMOC, Procedia Engineering, vol. 38, https://doi.org/10.1016/j.proeng.2012.06.070, 2012, pp. 561-571.
Wikipedia, "Autonomic computing", available from https://en.wikipedia.org/wiki/Autonomic_computing, Mar. 18, 2021, 7 pages.
Yasin, et al., "Code Smell Detection and Refactoring Using Automated Genetic Algorithm Approach", International Research Journal of Information Technology, vol. 1, No. 1, 2019, pp. 1-7.

* cited by examiner

SOFTWARE MICROSERVICE GENERATION

PRIORITY CLAIM

The present application is a National Phase entry of PCT Application No. PCT/EP2022/056219, filed Mar. 10, 2022, which claims priority from GB Patent Application No. 2103916.9, filed Mar. 22, 2021, each of which is hereby fully incorporated herein by reference.

TECHNICAL FIELD

The present disclosure relates to the generation of software microservices.

BACKGROUND

With an increasing transition of software to cloud service providers and the growing containerization of software into discrete software services that can interconnect through defined common interfaces, there is a growing need to generate new such services (also known as microservices) such as by new software development or the adaptation of existing software, such as legacy software systems.

Existing software, such as legacy software, can include a suite or required functionalities that are required of a new software service. However, such existing software also includes extraneous and/or legacy functionality that is no longer required. A process of analyzing such existing software to excise unnecessary code and/or components while retaining or extracting required logic is time consuming. Where such existing code is poorly documented or not documented at all, the cost involved in adapting such existing software can exceed the cost of developing from scratch.

SUMMARY

Thus, there is a need to improve the analysis and adaptation of existing software in the generation of new software services.

According to a first aspect of the present disclosure, there is provided a computer implemented method of generating a software service for providing required software functionality comprising: accessing a software component having a functionality including and exceeding the required functionality; defining verification test for verifying that the software component includes the required functionality; applying a genetic algorithm to the software component to iteratively adapt the software component over a plurality of generations, wherein each generation of the software component is adapted by removal of one or more portions of the software component of a preceding generation, wherein the adaptation for a generation is selected from a set of candidate adaptations based on a determination of a fitness of the component so adapted, the fitness being determined by the verification test, wherein the iteration of the genetic algorithm ceases in response to a stopping condition such that, on cessation, the latest generation of the software component constitutes the software service.

In some embodiments, the stopping condition includes one or more of: a predetermined number of iterations; a predetermined threshold reduction of a size of the software component over all generations; a predetermined threshold size of the latest generation of the software component; and a predetermined threshold measure of fitness determined by the verification test.

In some embodiments, the software service is constituted as a software container including the latest generation of the software component.

In some embodiments, at least a subset of the set of candidate adaptations is generated randomly.

In some embodiments, the one or more portions of the software component removed by the genetic algorithm include one or more of: a line of code; a function; a subroutine; a class; a procedure; a file; a method; a library; and a code construct.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
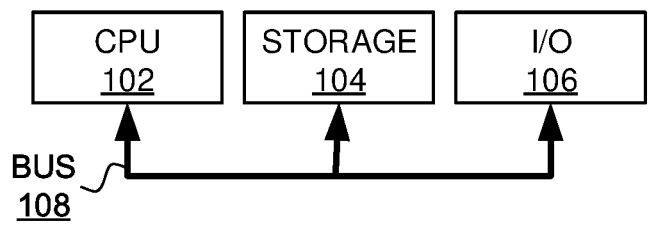
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
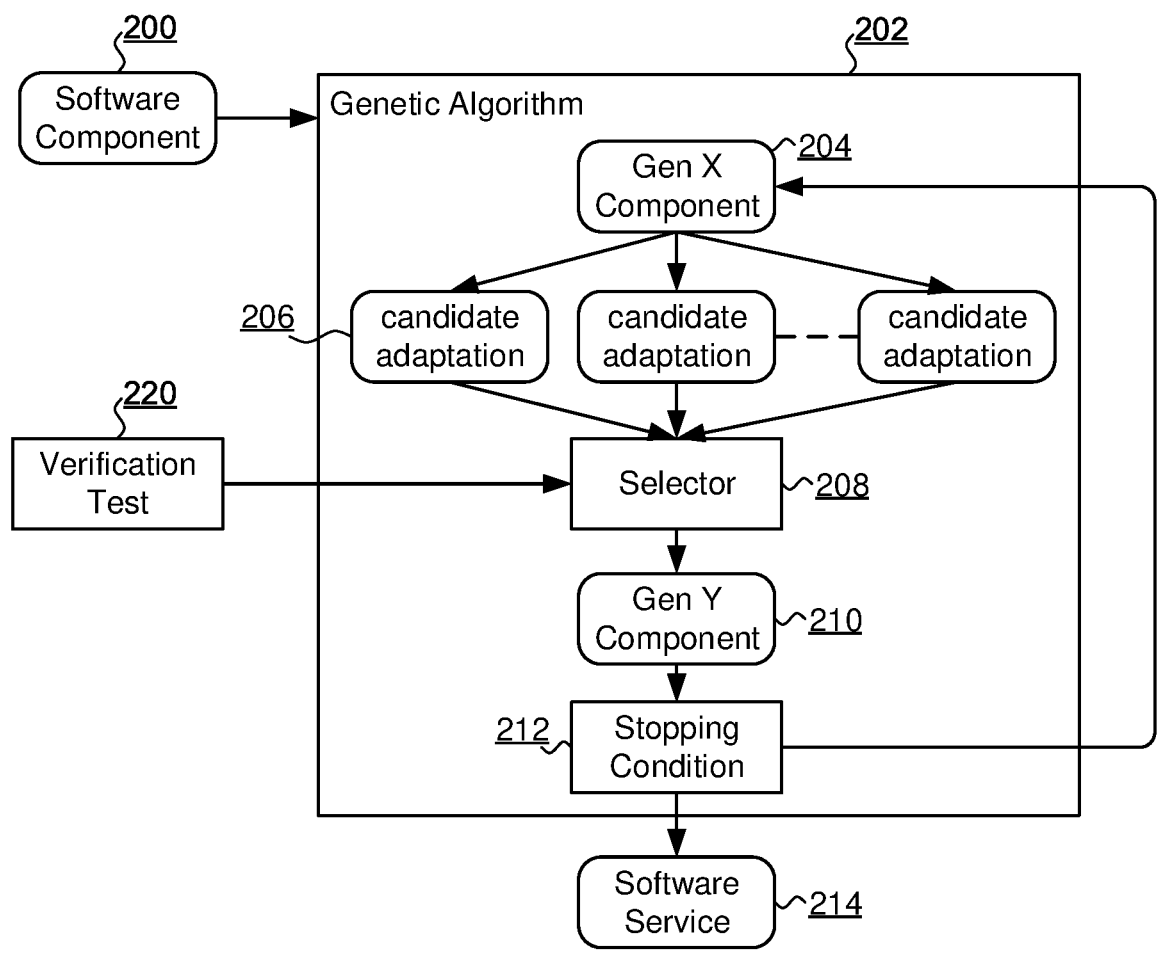
FIG. 2 is a component diagram of a software service generation system in accordance with embodiments of the present disclosure.

FIG. 2 is a component diagram of a software service generation system in accordance with embodiments of the present disclosure. The software service generation system is arranged to generate a software service such as a cloud service, a software container, a library, subroutine, class, method or similar, that provides required software functionality. The exact nature of the required software functionality of the generated software service is immaterial save that the provision of the required software functionality by a software component is determinable by a verification test 220. Thus, the verification test 220 is a test that is executed with a software component to determine if the component provides the required software functionality. It will be appreciated by those skilled in the art that the provision of functionality can be determined in many different ways depending on the nature of the functionality. For example, data modifications, outputs, messages, communications, proper data manipulation, expected return values, and other such features and outputs of a software component can be used in combination with inputs, data/file/communications provision, or similar to determine whether a software component provides any particular required software functionality.

The software service generation system includes a genetic algorithm 202 as a hardware, software, firmware or combination component embodying multi-generational adaptation process as is described below. The genetic algorithm 202 accesses a software component 200 including software code in either source code, object code, intermediate code or other suitable code form. The software component 200 has functionality that includes and exceeds the required functionality described above. The genetic algorithm 202 undertakes an iterative adaptation of the software component 200 over a plurality of generations such that each generation of the component is adapted by removal of one or more portions of the software component of a preceding generation. In particular, a current generation of the software component 200, indicated as Gen X component 204 (which, at a first generation, is constituted as the software component 200 itself), is processed to generate multiple candidate adaptations 206 for Gen X 204. Each candidate adaptation 206 is an adaptation to the code in the Gen X component 204 having one or more portions removed. The removal of portions of code from the Gen X component 204 can include, for example, inter alia, the removal of one or more of: a line of code; a function; a subroutine; a class; a procedure; a file; a method; a library; and a code construct such as a loop, a conditional construct or the like. One or more of the candidate adaptation 206 can be generated by, for example, a random selection of code portion(s) for removal. Additionally or alternatively, candidate adaptations 206 can be generated based on a previous removal on which basis the Gen X component 204 was constituted. For example, if a previous generation of the component had a line of code removed from a method or function therein, a subsequent candidate adaptation may remove another line of code from the same method or function, or may remove the entire method or function, or may remove one or more other methods or functions calling such method or function, or may remove one or more calls to such method or function, etc.

A selector component 208 is a hardware, software, firmware or combination component operable to select a candidate adaptation 206 from the set of candidates on which basis a next generation of the component will be constituted, indicated as Gen Y component 210. The selector 208 is operable to select based on a determination of a fitness of each candidate adaptation 206 by determining a fitness of the Gen X component 204 so adapted by each candidate adaptation 206. The fitness is determined based on the verification test 220 for verifying if the Gen X component 204 so adapted by a candidate adaptation 206 provides the required software functionality. In some embodiments, the fitness determination is binary such that the component so adapted is determined to be fit or not fit based on the verification test 220. Alternatively, the fitness determination can be non-binary such as by a measure of fitness based on, for example, an extent to which the required functionality is provided where such functionality can be measured in such a way. For example, where such required functionality has associated a performance requirement, an accuracy threshold, a responsiveness, a set of requirements or the like, then fitness can be determined as a degree of fitness with reference to such requirements.

Thus, the selector 208 selects a most fit candidate adaptation 206 as the next generation Gen Y component 210. In some embodiments, where two or more candidate adaptations 206 are deemed equally fit, then the selector 208 may select between them such as by random selection. In some embodiments, where multiple candidate adaptations 206 are equally fit or equally satisfy a fitness threshold, multiple instances of the genetic algorithm are executed each based on a different one of the fit candidate adaptations. In such embodiments, a further selection can be required between a final generation identified by each instance of the genetic algorithm, such as by using selection criteria including one or more of: a degree of fitness of the final generations; a size of the final generations; a performance of the final generations; and other criteria as will be apparent to those skilled in the art.

The genetic algorithm 202 iterates such that the Gen Y component 210 determined by the selector 208 becomes the new Gen X component 204 at a subsequent iteration on which bases further candidate adaptations are determined for selection therebetween. In this way, the software component 200 is gradually adapted by removal of portions thereof over the iterative process of the genetic algorithm 202.

The genetic algorithm includes a stopping condition 212 for determining when the iteration will cease. For example, the stopping condition 212 can includes one or more of, inter alia: a predetermined number of iterations; a predetermined threshold reduction of a size of the software component over all generations; a predetermined threshold size of the latest generation of the software component; and a predetermined threshold measure of fitness determined by the verification test. On satisfaction of the stopping condition 212, the cessation of the iteration leaves a latest generation of the component which is used to constitute the software service 214. In one embodiment, the software service is constituted as a software container including the latest generation of the software component.

In some embodiments, the software component 200 is a representation of the software component such as a unified modelling language (UML) representation generated based on software code. In such embodiments, the UML representation is subject to adaptation by the genetic algorithm by, for example, adaptation of the UML representation to remove elements of the UML representation. In such embodiments the selector 208 is further operable to adapt software code for execution in accordance with a candidate adaptation of a UML representation such that the verification test 220 can be applied to each candidate adaptation.

Figure 3:
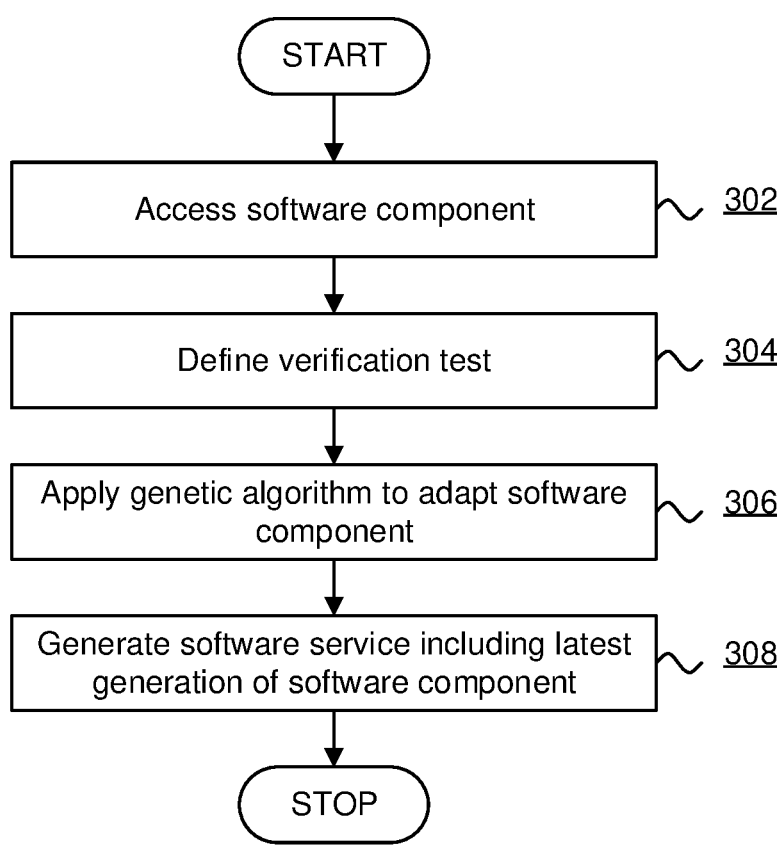
FIG. 3 is a flowchart of a method of generating a software service for providing required software functionality in accordance with embodiments of the present disclosure.

FIG. 3 is a flowchart of a method of generating a software service for providing required software functionality in accordance with embodiments of the present disclosure. Initially, at 302, the method accesses the software component 200 which has functionality including and exceeding the required functionality. At 304 the method defines the verification test 220 for verifying that the software component includes the required functionality. At 306 the method applies the iterative genetic algorithm 202 to adapt the software component over multiple generations based on fitness of adaptations determined by the verification test 220, as previously described. At 308 the method generates a software service including the latest generation of the software component adapted by the genetic algorithm 202.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure.

The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of generating a software service for providing required software functionality comprising:
    accessing a software component having functionality including and exceeding the required software functionality;
    defining a verification test for verifying that the software component includes the required software functionality; and
    applying a genetic algorithm to the software component to iteratively adapt the software component over a plurality of generations, wherein each generation of the software component is adapted by removal of one or more portions of the software component of a preceding generation, wherein the adaptation for a generation is selected from a set of candidate adaptations based on a determination of a fitness of the software component so adapted, the fitness being determined by the verification test,
    wherein the iterative adaptation of the genetic algorithm ceases in response to a stopping condition such that, on cessation, a latest generation of the software component constitutes the software service.

2. The method of claim 1, wherein the stopping condition includes one or more of: a predetermined number of iterations; a predetermined threshold reduction of a size of the software component over all generations; a predetermined threshold size of the latest generation of the software component; or a predetermined threshold measure of fitness determined by the verification test.

3. The method of claim 1, wherein the software service is constituted as a software container including the latest generation of the software component.

4. The method of claim 1, wherein at least a subset of the set of candidate adaptations is generated randomly.

5. The method of claim 1, wherein the one or more portions of the software component removed by the genetic algorithm include one or more of: a line of code; a function; a subroutine; a class; a procedure; a file; a method; a library; or a code construct.

6. A computer system comprising a processor and memory storing computer program code for performing the method of claim 1.

7. A non-transitory computer-readable storage medium comprising computer program code to, when loaded into a computer system and executed thereon, cause the computer system to perform the method as claimed in claim 1.

* * * * *